(12) United States Patent
Soejima

(10) Patent No.: US 11,822,623 B2
(45) Date of Patent: Nov. 21, 2023

(54) TRAVELING AMOUNT ESTIMATION APPARATUS, MODEL GENERATION APPARATUS, TRAVELING AMOUNT ESTIMATION METHOD AND RECORDING MEDIUM

(71) Applicant: CASIO COMPUTER CO., LTD., Tokyo (JP)

(72) Inventor: Junichiro Soejima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 147 days.

(21) Appl. No.: 17/178,310

(22) Filed: Feb. 18, 2021

(65) Prior Publication Data

US 2021/0285982 A1 Sep. 16, 2021

(30) Foreign Application Priority Data

Mar. 16, 2020 (JP) .................................. 2020-045664

(51) Int. Cl.
G06F 18/23213 (2023.01)
G01P 15/08 (2006.01)
G06F 18/2413 (2023.01)

(52) U.S. Cl.
CPC ........ *G06F 18/23213* (2023.01); *G01P 15/08* (2013.01); *G06F 18/24137* (2023.01)

(58) Field of Classification Search
CPC ..... G01P 15/08; G06K 9/6223; G06K 9/6272
USPC ...................................................... 73/514.16
See application file for complete search history.

(56) References Cited

U.S. PATENT DOCUMENTS

| | | | |
|---|---|---|---|
| 8,990,046 B2 | 3/2015 | Lee et al. | |
| 10,240,945 B2 | 3/2019 | Uchida | |
| 2011/0178759 A1* | 7/2011 | Uchida | G01C 22/006 73/488 |
| 2012/0006112 A1* | 1/2012 | Lee | G01C 22/006 73/504.02 |
| 2013/0080255 A1* | 3/2013 | Li | G01C 22/006 701/410 |
| 2019/0209022 A1* | 7/2019 | Sobol | A61B 5/0022 |

FOREIGN PATENT DOCUMENTS

| | | |
|---|---|---|
| JP | H07333000 A | 12/1995 |
| JP | 2013533481 A | 8/2013 |
| JP | 2015184159 A | 10/2015 |
| JP | 2019165658 A | 10/2019 |

OTHER PUBLICATIONS

Japanese Office Action dated May 17, 2022, issued in counterpart Japanese Application No. 2020-045664.

* cited by examiner

*Primary Examiner* — Alesa Allgood
*Assistant Examiner* — Byung Ro Lee
(74) *Attorney, Agent, or Firm* — Holtz, Holtz & Volek PC

(57) ABSTRACT

One aspect of the present disclosure relates to a traveling amount estimation apparatus, comprising: at least one processor; and at least one memory that stores a program executed by the processor, wherein the processor is configured to: extract a feature amount from sensor data obtained from a traveling user and relating to traveling of the user; determine to which cluster the feature amount belongs; and estimate a traveling amount of the user from the feature amount in accordance with a regression function for the determined cluster.

10 Claims, 9 Drawing Sheets

TRAVELING AMOUNT ESTIMATION APPARATUS, MODEL GENERATION APPARATUS, TRAVELING AMOUNT ESTIMATION METHOD AND RECORDING MEDIUM

CROSS-REFERENCE TO RELATED APPLICATION

The present application is based on and claims priority to JP application No. 2020-045664 filed on Mar. 16, 2020 with the Japan Patent Office, the entire contents of which are hereby incorporated by reference.

BACKGROUND OF THE INVENTION

1. Field of the Invention

The present disclosure relates to a traveling amount estimation apparatus, a model generation apparatus, a traveling amount estimation method and a recording medium.

2. Description of the Related Art

Users can use portable terminals, such as a smartphone and a wearable device, to check a current position, a traveling distance or the like easily. Typically, the user can use a GPS (Global Positioning System) function incorporated in the portable terminal to determine the user's position.

Also, the user can use an autonomous navigation function to determine the current position and the traveling distance. For example, while the user is walking, the traveling distance from a starting point can be estimated based on the number of user's steps and the user's stride. (For example, see Japanese Laid-Open Publication JPH 7-333000.)

SUMMARY OF THE INVENTION

One aspect of the present disclosure relates to a traveling amount estimation apparatus, comprising: at least one processor; and at least one memory that stores a program executed by the processor, wherein the processor is configured to: extract a feature amount from sensor data obtained from a traveling user; determine to which cluster the feature amount belongs; and estimate a traveling amount from the feature amount in accordance with a regression function for the determined cluster.

DETAILED DESCRIPTION OF THE PREFERRED EMBODIMENTS

In the following embodiments, a model generation apparatus that uses supervised data to generate a regression model for estimating a traveling amount from sensor data, and a traveling amount estimation apparatus that uses the generated regression model to estimate the traveling amount from the sensor data detected for a traveling user are disclosed. Throughout the present specification and claims, the term "traveling" may mean traveling of a user through user's own physical activity particularly with his or her feet, for example, walking and running. Also, the term "running" may include jogging, trekking and so on.

[Overview of Present Disclosure]

Figure 1:
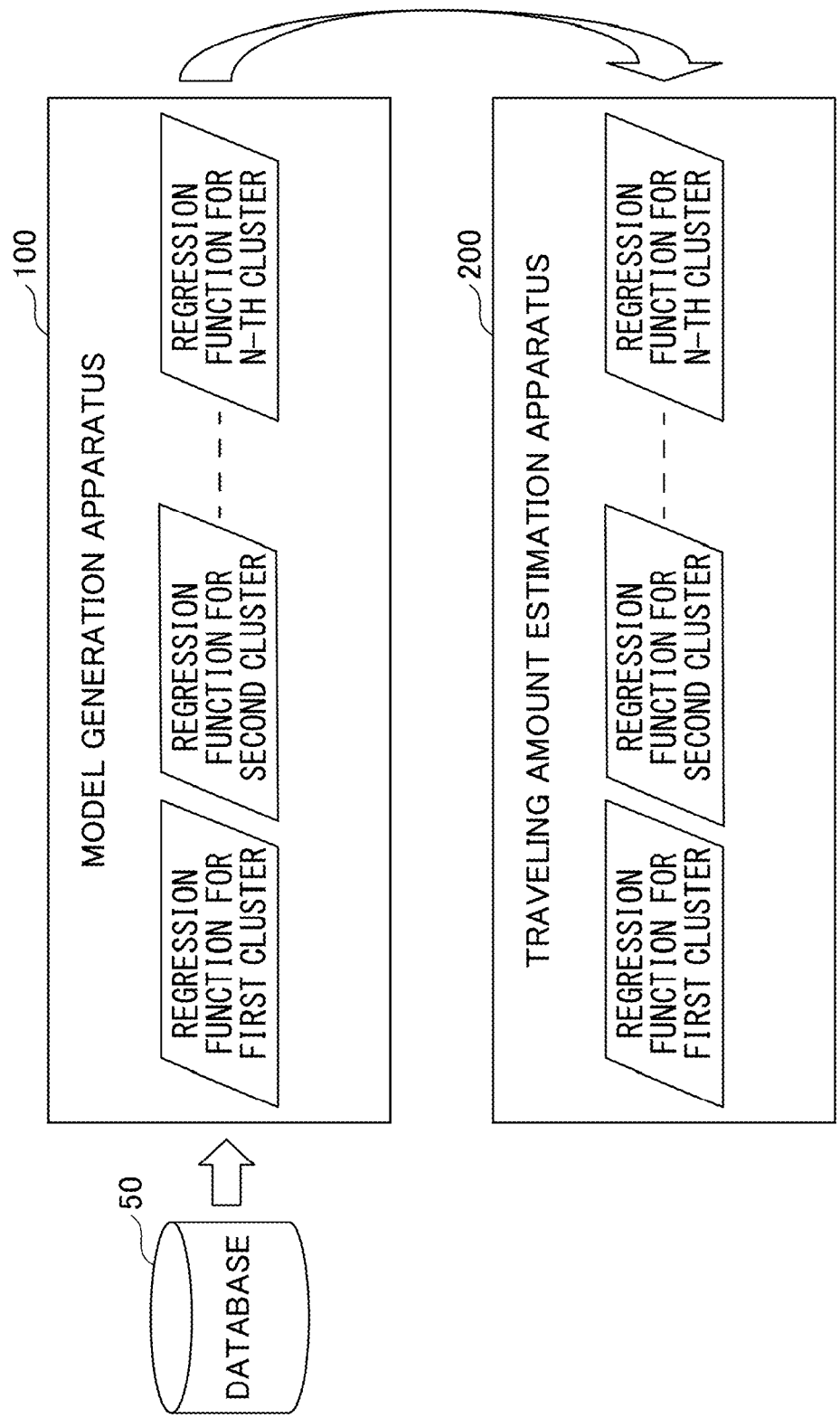
FIG. 1 is a schematic diagram for illustrating a model generation apparatus and a traveling amount estimation apparatus according to one embodiment of the present disclosure.

In the overview of the embodiments described below, as illustrated in FIG. 1, a mode generation apparatus 100 obtains training data including sensor data and traveling amounts from a database 50 and calculates a plurality of feature amounts (for example, local minimum values, local maximum values, average values or the like of various sensor data) from the obtained sensor data (for example, acceleration data, angular velocity data or the like). Then, the model generation apparatus 100 plots feature vectors composed of the calculated feature amounts on a feature space and clusters the plotted feature vectors. Then, the model generation apparatus 100 performs multiple regression analysis on a set of the feature vectors included in each cluster and ground-truth traveling amounts to derive a regression function for estimating traveling amounts from the feature vectors for each cluster and provides the derived regression functions for respective clusters as a traveling amount estimation model to the traveling amount estimation apparatus 200.

The traveling amount estimation apparatus 200 extracts the feature amounts from the sensor data obtained from the traveling user to determine to which clusters the feature amounts belong. Then, the traveling amount estimation apparatus 200 uses the regression function for the determined cluster from the regression functions for respective clusters provided from the model generation apparatus 100 to estimate the traveling amount of the user from the extracted feature amount.

In this fashion, it is possible to estimate the traveling amount with a high accuracy by using the regression function for each cluster corresponding to the cluster for the detected sensor data.

[Hardware Arrangement]

Figure 2:
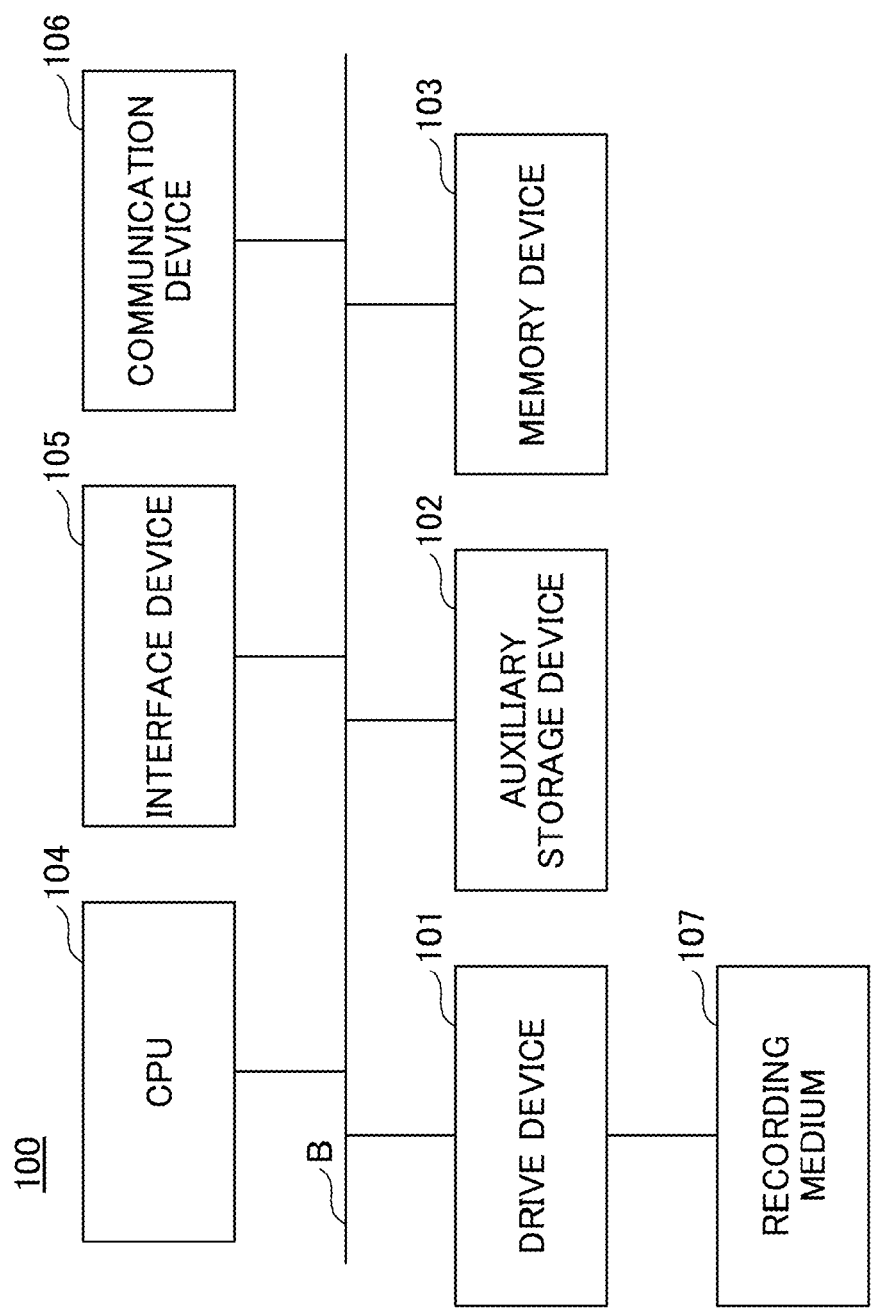
FIG. 2 is a block diagram for illustrating a hardware arrangement of the model generation apparatus according to one embodiment of the present disclosure.

Here, the model generation apparatus 100 may be a computing device such as a personal computer and a server and have a hardware arrangement as illustrated in FIG. 2, for example. Specifically, the model generation apparatus 100 has a drive device 101, an auxiliary storage device 102, a memory device 103, a CPU (Central Processing Unit) 104, an interface device 105 and a communication device 106, which are interconnected via a bus B.

Various computer programs including programs or instructions to implement various functions and operations of the model generation apparatus 100 as stated below may be provided through a recording medium 107 such as a CD-ROM (Compact Disk-Read Only Memory). When the recording medium 107 storing the programs is loaded to the drive device 101, the programs are installed from the recording medium 107 into the auxiliary storage device 102 through the drive device 101. However, the programs may be unnecessarily installed from the recording medium 107 and may be downloaded from any external device via a network. The auxiliary storage device 102 stores the installed programs as well as necessary files and data. Upon an activation instruction for the programs, the memory device 103 fetches and stores the programs and data from the auxiliary storage device 102. The auxiliary storage device 102 and the memory device 103 serving as at least one memory may be implemented as a non-transitory computer readable storage medium for storing the programs or instructions. The CPU 104 serving as at least one processor performs various functions and operations of the model generation apparatus 100 in accordance with the programs stored in the memory device 103 and various data such as parameters required to execute the programs. The interface device 105 may be an input device such as a keyboard and a mouse, an output device such as a display, and so on and serve as a user interface with a user. The communication device 106 performs various communication operations to communicate with external devices.

Figure 3:
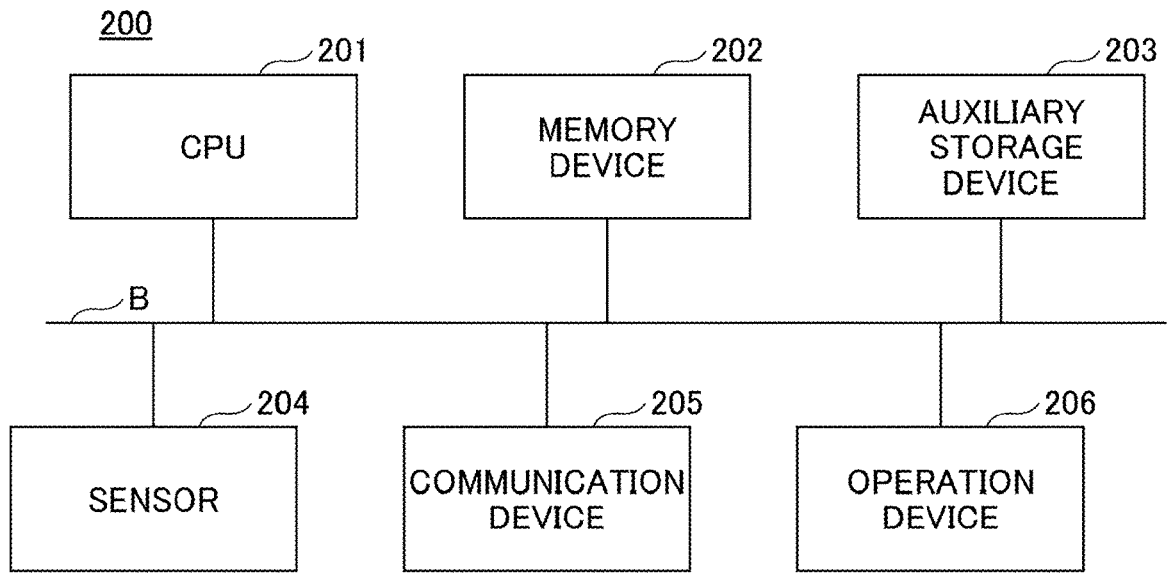
FIG. 3 is a block diagram for illustrating a hardware arrangement of the traveling amount estimation apparatus according to one embodiment of the present disclosure.

Also, the traveling amount estimation apparatus 200 may be a portable device carried by a user and have a hardware arrangement as illustrated in FIG. 3, for example. Specifically, the traveling amount estimation apparatus 200 has a CPU 201, a memory device 202, an auxiliary storage device 203, a sensor 204, a communication device 205 and an operation device 206.

Various computer programs including programs or instructions to implement various functions and operations in the traveling amount estimation apparatus 200 as stated below may be installed into the auxiliary storage device 203, and upon an activation instruction for the traveling amount estimation apparatus 200, the memory device 202 fetches and stores the programs and data from the auxiliary storage device 203. The auxiliary storage device 203 and the memory device 202 serving as at least one memory may be implemented as a non-transitory computer readable storage medium for storing the programs or instructions. The CPU 201 serving as at least one processor performs various functions and operations of the traveling amount estimation apparatus 200 based on sensor data obtained from the sensor 204 in accordance with the programs stored in the memory device 202 and various data such as parameters required to execute the programs. The sensor 204 may be an acceleration sensor, a gyro sensor or the like to detect various data related to user's traveling. The traveling amount estimation apparatus 200 (sensor 204) may be attached to a portion of user's body such as an arm or a waist. In such a case, the various data related to user's traveling detected by the sensor 204 may represent an acceleration or an angular velocity of that portion during user's traveling. The communication device 205 may transmit the traveling amount estimated from the sensor data to other information terminals such as a smartphone and a smart watch. The operation device 206 may be a switch for power on/off, a lamp indicative of a power on/off state, a setting button, a display panel or the like.

However, the model generation apparatus 100 and the traveling amount estimation apparatus 200 are not limited to the above-stated hardware arrangements and may be implemented in any other appropriate hardware arrangement such as one or more circuitries that implement one or more of the functions and operations of the traveling amount estimation apparatus 200, for example.

[Model Generation Apparatus]

Figure 4:
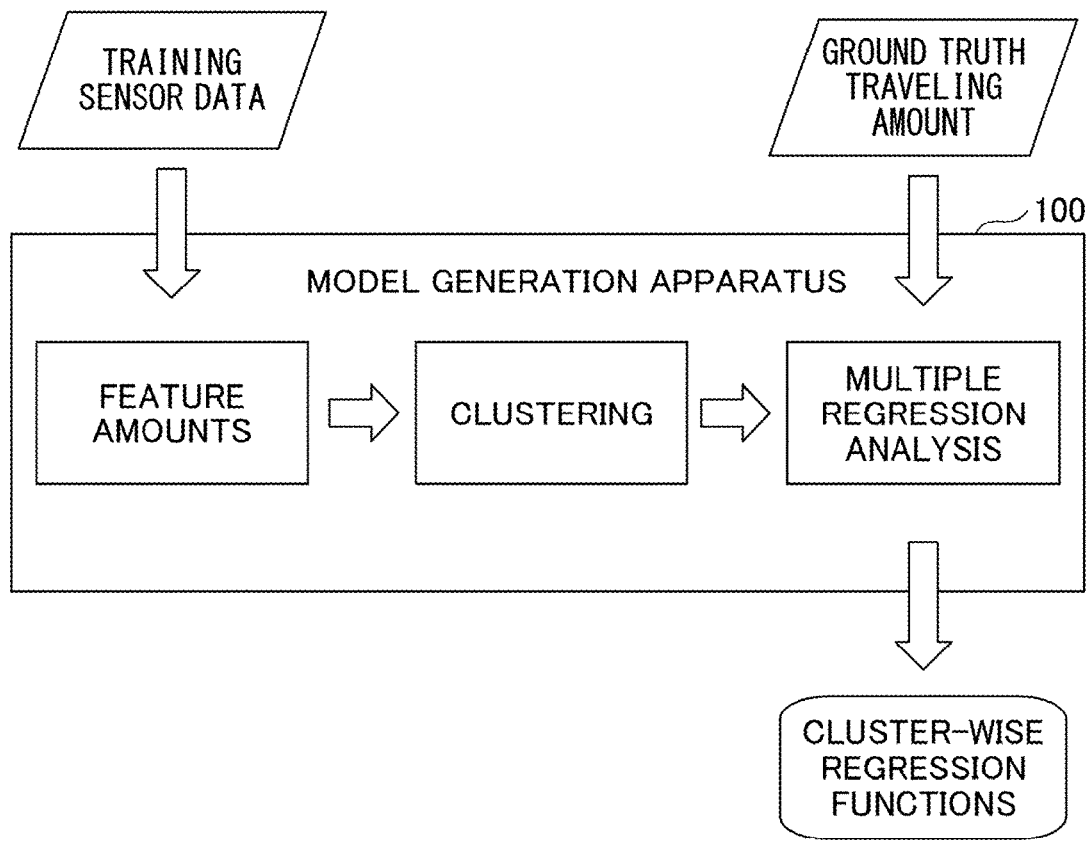
FIG. 4 is a schematic diagram for illustrating a model generation operation according to one embodiment of the present disclosure.

Next, the model generation apparatus 100 according to one embodiment of the present disclosure is described with reference to FIGS. 4 to 6. FIG. 4 is a schematic diagram for illustrating a model generation operation according to one embodiment of the present disclosure.

As illustrated in FIG. 4, the model generation apparatus 100 uses training data composed of training sensor data and ground-truth traveling amounts stored in the database 50 to derive regression functions for respective clusters. Specifically, the model generation apparatus 100 extracts a plurality of types of feature amounts (for example, the local minimum value, the local maximum value, the average value, the standard derivation or the like) from the training sensor data to cluster feature vector groups composed of the extracted feature amounts. Then, the model generation apparatus 100 performs multiple regression analysis on the feature vector group and the ground-truth traveling amounts for each cluster to derive the regression functions for respective clusters.

Figure 5:
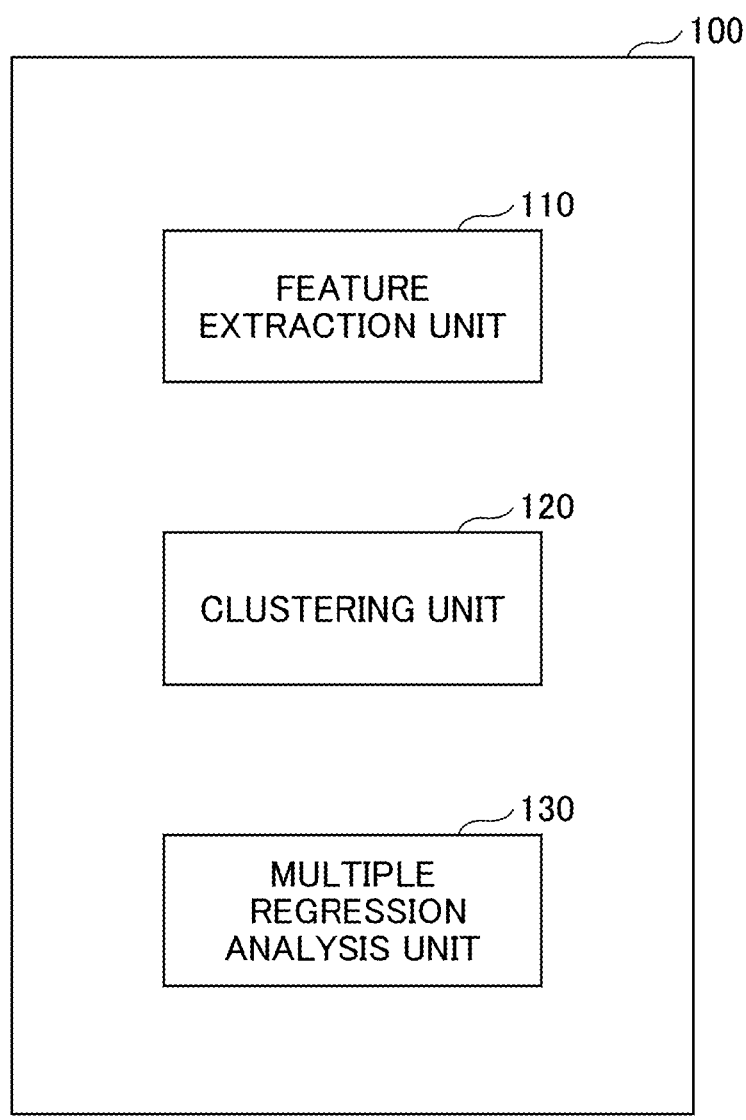
FIG. 5 is a block diagram for illustrating a functional arrangement of the model generation apparatus according to one embodiment of the present disclosure.
Figure 6:
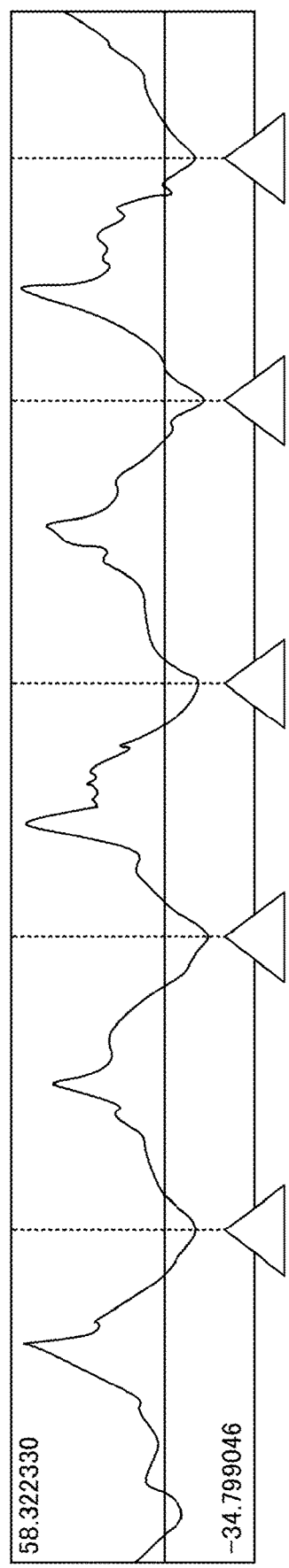
FIG. 6 is a diagram for one exemplary acceleration data during traveling according to one embodiment of the present disclosure.

FIG. 5 is a block diagram for illustrating a functional arrangement of the model generation apparatus 100 according to one embodiment of the present disclosure. As illustrated in FIG. 5, the model generation apparatus 100 has a feature extraction unit 110, a clustering unit 120 and a multiple regression analysis unit 130.

The feature extraction unit 110 extracts a feature amount from sensor data. For example, the sensor data may be time-series data, such as acceleration data or angular velocity data, measured with a sensor while various subjects are traveling at predetermined several speeds, and be obtained as training data in association with the traveling amounts of the subjects during the traveling.

Also, the feature amount may be various types of statistics that can be extracted from the sensor data. Specifically, if the training sensor data is time-series of acceleration data of the subjects travelling at the predetermined speeds, the feature extraction unit 110 divides the acceleration data into sections, each of which corresponds to one step of the subjects, and extracts a plurality of feature amounts of each section of the acceleration data, such as a local minimum value, a local maximum value, an average value and a standard deviation. Typically, the acceleration data is composed of accelerations in three axial directions, and in order to determine the single step section, for example, the feature extraction unit 110 may focus on the acceleration in the direction vertical to the ground surface (see FIG. 6) and assumes that the subjects have been grounded at the local minimum value or the local maximum value of the vertically directional acceleration to determine each of the segments (between one vertical dashed line and its adjacent vertical dashed line), as illustrated in FIG. 6.

Upon extracting the various feature amounts for each segment, the feature extraction unit 110 represents the feature amounts for the segment as a point on a vector space. For example, if a plurality of types of feature amounts, such as a local minimum value, a local maximum value, an average value and a standard deviation, are extracted from multiple axes of sensor data of accelerations or angular velocities, the respective segments can be represented as points on the vector space having a number of dimensions corresponding to the number of types of the extracted feature amounts.

The clustering unit 120 clusters the extracted feature amounts. Specifically, for the training sensor data obtained while the different subjects are traveling at the predetermined several speeds, the clustering unit 120 extracts a plurality of feature amounts as stated above and represents the respective segments as a feature vector based on the extracted feature amounts. Upon obtaining a collection of feature vectors from the provided training sensor data, the clustering unit 120 plots each of the feature vectors on the vector space and clusters the plotted feature vectors. For example, this clustering may be performed in accordance with any appropriate clustering algorithm such as k-means method. Here, the cluster number k may be configured depending on variations of the training sensor data. Typically, it may be considered that each of the clusters may be composed of feature amounts that are extracted from the sensor data obtained while subjects of a certain type (for example, subjects having similar physiques) are traveling at the same speed.

The multiple regression analysis unit 130 derives a regression function for each cluster. Specifically, when the clustering unit 120 clusters the feature vectors, the multiple regression analysis unit 130 obtains ground-truth traveling amounts from the database 50 and performs multiple regression analysis on the feature vectors for each of the clusters and the obtained ground-truth traveling amounts. Typically, the ground-truth traveling amount is a traveling amount during a measurement period of the collected time-series of sensor data. Accordingly, for example, if a cluster of interest corresponds to the sensor data obtained while the subjects of the certain type are traveling at a certain speed, the multiple regression analysis unit 130 can calculate the traveling amount per segment, that is, the traveling amount corresponding to one step, by dividing the ground-truth traveling amount corresponding to the time-series of sensor data by the number of segments, and associate the respective segments with the traveling amount per segment. Upon obtaining the association of the respective segments with the traveling amounts of the segments, the multiple regression analysis unit 130 can perform multiple regression analysis on the feature vectors in the cluster to derive a regression function for estimating the traveling amount from the feature vector.

For example, the multiple regression analysis unit 130 may perform linear multiple regression analysis to derive a linear regression function. For example, if a traveling amount y is estimated from n types of feature amounts x1 to xn in accordance with the linear multiple regression analysis, the linear regression equation $$y = a1x1 + a2x2 + \ldots + anxn + a0$$

may be derived. Note that a0 to an are coefficients.

In this fashion, the multiple regression analysis unit 130 derives the regression function for each cluster and obtains the regression functions for the respective clusters. The multiple regression analysis unit 130 provides the obtained regression functions for respective clusters to the traveling amount estimation apparatus 200.

[Model Generation Operation]

Figure 7:
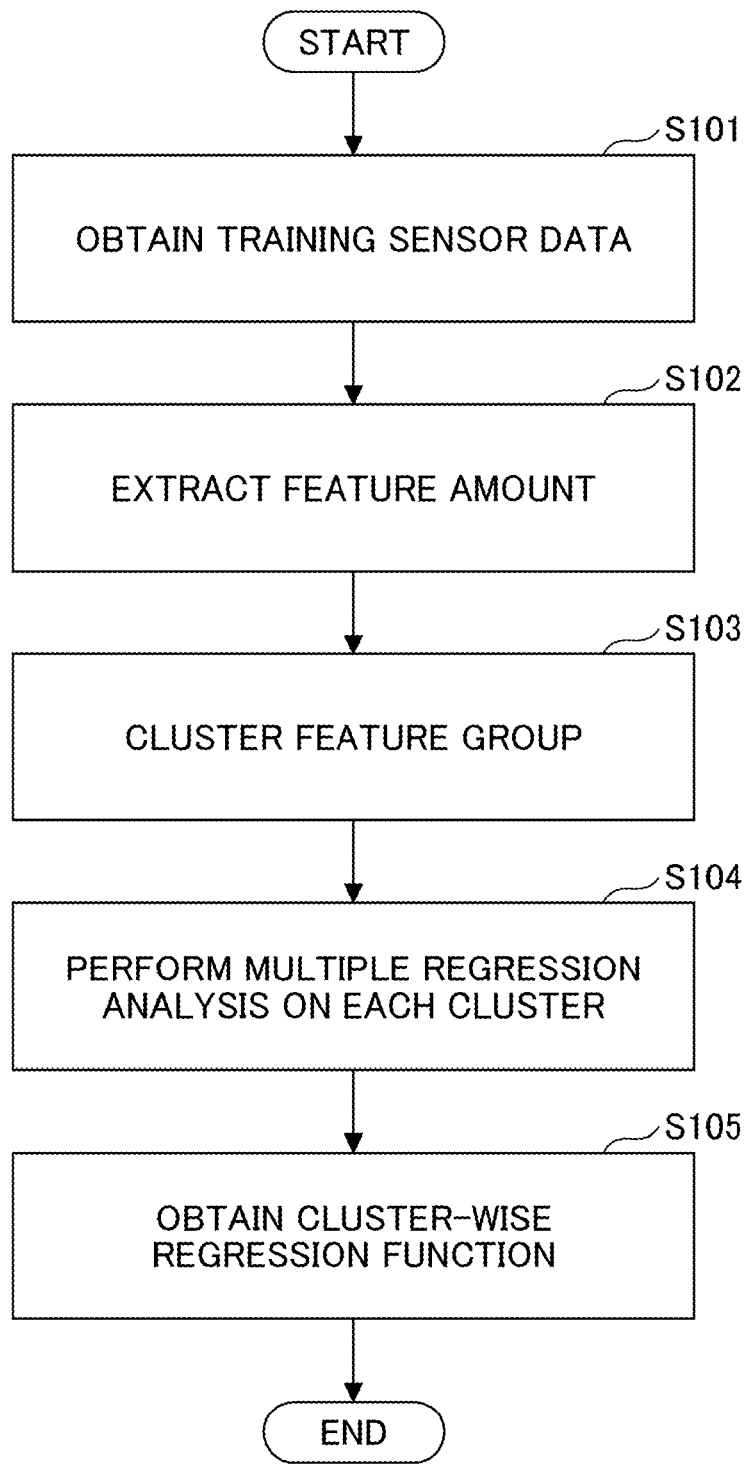
FIG. 7 is a flowchart for illustrating the model generation operation according to one embodiment of the present disclosure.

Next, a model generation operation according to one embodiment of the present disclosure is described with reference to FIG. 7. The model generation operation may be implemented by the above-stated model generation apparatus 100, for example, by a processor in the model generation apparatus 100 executing programs or instructions. FIG. 7 is a flowchart for illustrating a model generation operation according to one embodiment of the present disclosure.

As illustrated in FIG. 7, at step S101, the model generation apparatus 100 obtains training sensor data. For example, the training sensor data may be time-series of sensor data indicative of movement of traveling subjects and more specifically may be acceleration data detected with an acceleration sensor, angular velocity data detected with a gyro sensor, and so on. Also, the training sensor data is stored in the database 50 in association with traveling amounts of the subjects during a measurement period. For example, pairs of the sensor data and the traveling amounts of the different subjects for various speeds can be obtained by instructing the subjects to travel at predetermined different speeds, detecting the movements of the traveling subjects and measuring the traveling amounts during the measurement period.

At step S102, the model generation apparatus 100 extracts a feature amount from the sensor data. For example, if the training sensor data is time-series of acceleration data, the model generation apparatus 100 identifies a segment corresponding to one step of the subject based on the local minimum value or the local maximum value of the acceleration data in the direction vertical to the ground surface and divides the acceleration data into the identified segments. Then, the model generation apparatus 100 extracts predetermined feature amounts, such as the local minimum value, the local maximum value, the average value or the standard deviation, from the acceleration data for the respective segments.

At step S103, the model generation apparatus 100 clusters the feature amounts. Specifically, the model generation apparatus 100 plots feature vectors, composed of the feature amounts that are extracted for the respective segments, as points on the feature space. Upon plotting all the extracted feature vectors on the feature space, the model generation apparatus 100 can cluster the feature vectors plotted on the feature space. For example, the model generation apparatus 100 may cluster the feature vectors in accordance with k-means method. Here, the constant k may be set depending on variations of the subjects and/or traveling speeds, for example.

At step S104, the model generation apparatus 100 performs multiple regression analysis on the feature vectors for each cluster. Specifically, the model generation apparatus 100 obtains ground-truth traveling amounts from the database 50 and calculates the traveling amounts corresponding to the respective segments based on the obtained ground-truth traveling amounts. Then, at step S105, for each of the clusters, the model generation apparatus 100 performs multiple regression analysis based on correspondence between the respective feature vectors in the cluster and the calculated traveling amounts to derive a regression function for that cluster. For example, if the regression function is derived in accordance with linear multiple regression analysis, the model generation apparatus 100 may derive a linear regression equation $$y = a1x1 + a2x2 + \ldots + anxn + a0$$

for the feature vector x=(x1, x2, . . . , xn). Here, y is the traveling amount for the segment, and a0 to an are coefficients.

At step S105, upon deriving the regression function for each of the clusters as stated above, the model generation apparatus 100 provides the obtained regression functions for respective clusters to the traveling amount estimation apparatus 200.

[Traveling Amount Estimation Apparatus]

Next, the traveling amount estimation apparatus 200 according to one embodiment of the present disclosure is described with reference to FIGS. 8 and 9. Typically, the traveling amount estimation apparatus 200 is carried by a user to estimate the user's traveling amount from sensor data detected from the traveling user.

Figure 8:
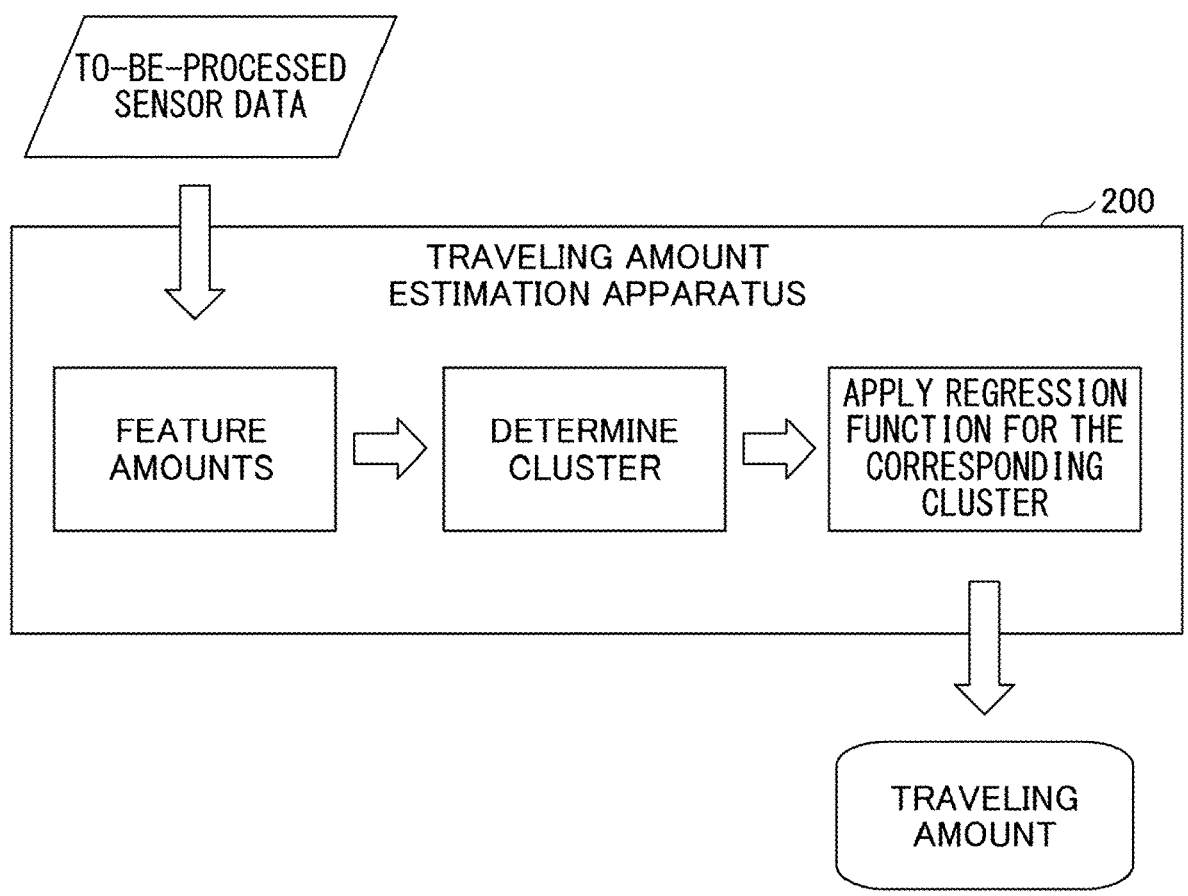
FIG. 8 is a schematic diagram for illustrating a traveling amount estimation operation according to one embodiment of the present disclosure.

As illustrated in FIG. 8, the traveling amount estimation apparatus 200 uses the regression functions for respective clusters provided from the model generation apparatus 100 to estimate the traveling amounts from to-be-processed sensor data. More specifically, the traveling amount estimation apparatus 200 extracts a plurality of types of feature amounts (for example, the local minimum value, the local maximum value, the average value, the standard deviation or the like of the sensor data) from the to-be-processed sensor data and determines to which cluster the feature vector composed of the extracted feature amounts belongs. Then, the traveling amount estimation apparatus 200 uses a regression function corresponding to the determined cluster to calculate the traveling amount from the feature vector.

Figure 9:
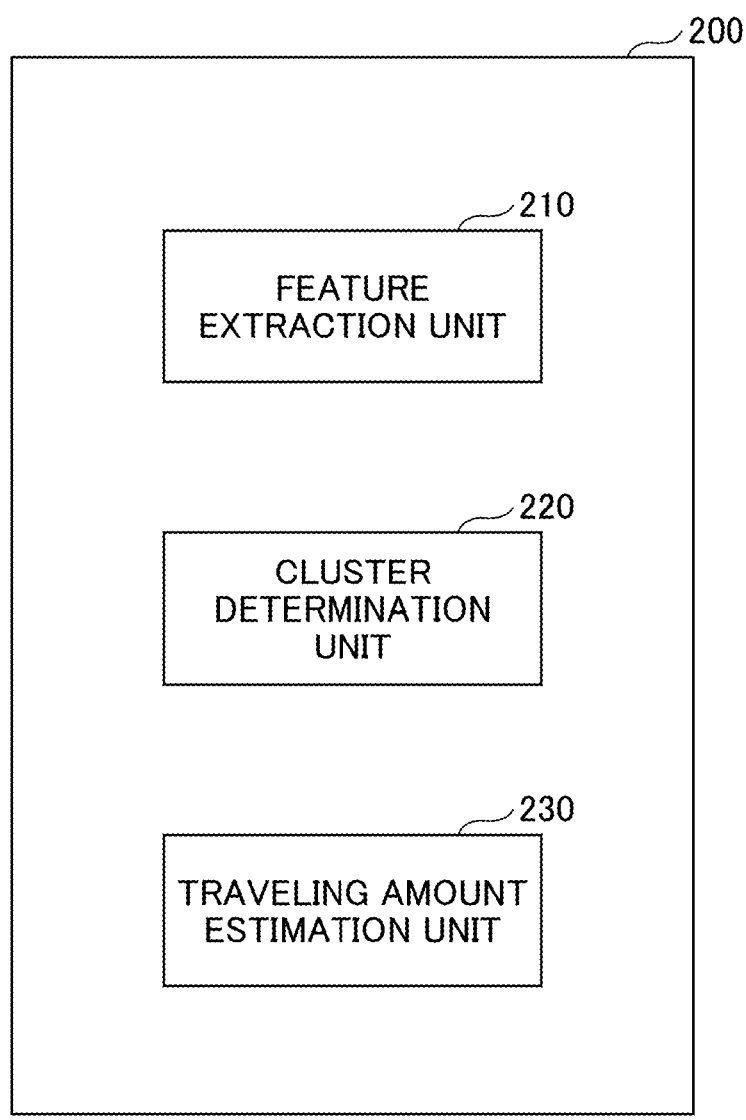
FIG. 9 is a block diagram for illustrating a functional arrangement of the traveling amount estimation apparatus according to one embodiment of the present disclosure.

FIG. 9 is a block diagram for illustrating a functional arrangement of the traveling amount estimation apparatus 200 according to one embodiment of the present disclosure. As illustrated in FIG. 9, the traveling amount estimation apparatus 200 has a feature extraction unit 210, a cluster determination unit 220 and a traveling amount estimation unit 230.

The feature extraction unit 210 extracts a feature amount from sensor data. Specifically, upon obtaining the sensor data indicative of movement of a traveling user from a sensor, similar to the feature extraction unit 110, the feature extraction unit 210 identifies segments corresponding to one step from the obtained sensor data and divides the sensor data by the identified segments. The feature extraction unit 210 extracts one or more predetermined types of feature amounts (for example, the local minimum value, the local maximum value, the average value, the standard deviation or the like) from the sensor data for the respective segments. The types of feature amounts are the same as the types of feature amounts extracted by the feature extraction unit 110 of the model generation apparatus 100 and correspond to the types of feature amounts selected as one or more arguments of the regression functions for respective clusters provided from the model generation apparatus 100.

The cluster determination unit 220 determines to which cluster the feature amount belongs. Specifically, the cluster determination unit 220 determines to which of k clusters on the feature space the feature vectors extracted from the sensor data for the respective segments belong. The clusters on the feature space are determined by the model generation apparatus 100, and the cluster determination unit 220 may determine to which of the clusters the feature vector belongs based on the distance between each centroid of the multiple clusters on the feature space and the feature vector. For example, the cluster determination unit 220 may determine the cluster having the nearest centroid to the feature vector as the cluster to which that feature vector belongs. The determined cluster is determined as any of the clusters determined by the clustering unit 120 in the model generation apparatus 100.

The traveling amount estimation unit 230 estimates the traveling amount from the feature amount in accordance with the regression function for the cluster. Specifically, the traveling amount estimation unit 230 inputs the feature vector to the regression function corresponding to the cluster determined by the cluster determination unit 220 to calculate the traveling amount. The calculated traveling amount is the estimated traveling amount of the user during the segment. The traveling amount estimation unit 230 can calculate the traveling amounts for the respective successive segments in a measurement period and provide an accumulated value of the calculated traveling amounts as the estimated traveling amount of the user during the measurement period.

Note that the traveling amount estimation unit 230 may transmit the calculated traveling amounts for the respective segments to other device, such as a smartphone and a smart watch, carried by the user, and the device may calculate the accumulated value of the traveling amounts for the respective segments and determine the estimated traveling amount of the user during the measurement period.

[Traveling Amount Estimation Operation]

Figure 10:
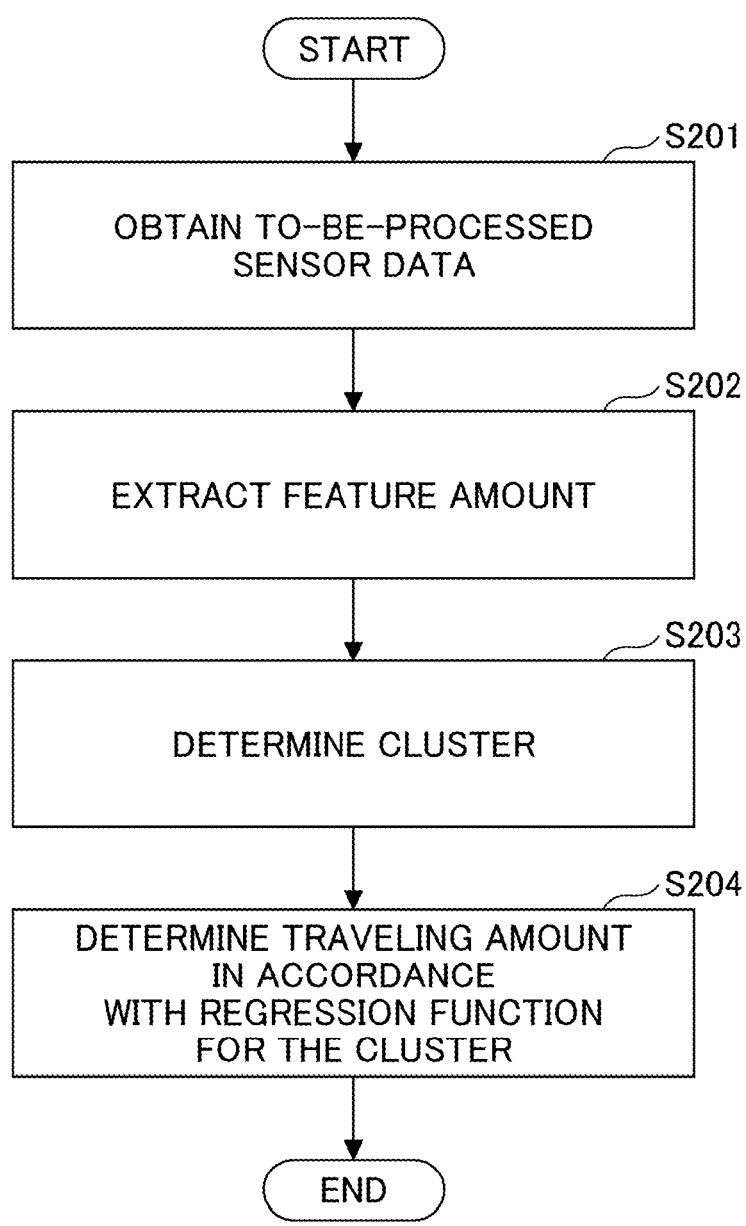
FIG. 10 is a flowchart for illustrating the traveling amount estimation operation according to one embodiment of the present disclosure.

Next, a traveling amount estimation operation according to one embodiment of the present disclosure is described with reference to FIG. 10. The traveling amount estimation operation may be implemented by the above-stated traveling amount estimation apparatus 200, for example, by a processor in the traveling amount estimation apparatus 200 executing programs or instructions. FIG. 10 is a flowchart for illustrating a traveling amount estimation operation according to one embodiment of the present disclosure.

As illustrated in FIG. 10, at step S201, the traveling amount estimation apparatus 200 obtains to-be-processed sensor data. For example, the to-be-processed sensor data may be time-series data indicative of movement of a traveling user carrying the traveling amount estimation apparatus 200 and more specifically may be acceleration data detected with an acceleration sensor, angular velocity data detected with a gyro sensor or the like.

At step S202, the traveling amount estimation apparatus 200 extracts a feature amount from the sensor data. For example, if the to-be-processed sensor data is time-series of acceleration data, the traveling amount estimation apparatus 200 may identify segments, each of which corresponds to one step of subjects, based on the local minimum value or the local maximum value of the acceleration data in the direction vertical to the ground surface and divides the acceleration data by the identified segments. Then, the traveling amount estimation apparatus 200 extracts one or more predetermined feature amounts, such as the local minimum value, the local maximum value, the average value and the standard deviation, for the acceleration data of the respective segments.

At step S203, the traveling amount estimation apparatus 200 determines to which cluster the feature amount belongs. Specifically, the traveling amount estimation apparatus 200 determines the distance between a feature vector composed of the feature amounts extracted from the sensor data for each segment and the centroids of the clusters and classifies the feature vector into the cluster having the shortest distance.

At step S204, the traveling amount estimation apparatus 200 applies a regression function corresponding to the determined cluster to calculate the traveling amount from the feature vector. The traveling amount estimation apparatus 200 may accumulate the traveling amounts calculated over a measurement period and estimate the user's traveling amounts during the measurement period. Alternatively, the traveling amount estimation apparatus 200 may transmit the traveling amounts calculated for the respective segments to an external device, and the external device may estimate the user's traveling amount during the measurement period.

The disclosed invention is not limited to the above certain embodiments, and various modifications can be made in practice within the scope of its sprit. Also, the respective embodiments may be combined and implemented as needed, and combined advantages may be obtained. In addition, inventions of various phases are included in the above embodiments, and various inventions can be retrieved in appropriate combinations of the disclosed multiple components. For example, even if some are deleted from all the components disclosed in the embodiments, arrangements without the components can be retrieved as inventions.

What is claimed is:

1. A traveling amount estimation apparatus, comprising:
    at least one sensor that detects movement of a user, and outputs sensor data indicative of the movement of the user;
    at least one processor; and
    at least one memory that stores a program executable by the processor,
        wherein the at least one memory stores, in advance, a plurality of clusters of feature vectors plotted in vector space, each feature vector being composed of a plurality of different types of feature amounts for a segment calculated from training sensor data included in training data, wherein each of the plurality of clusters is associated with a corresponding regression function derived based on the feature vectors and traveling amounts associated with the training sensor data;
        wherein the processor is configured, under control of the program, to:
        control the at least one sensor to output sensor data, and obtain the sensor data output from the at least one sensor,
        extract a plurality of types of feature amounts from a segment of the sensor data obtained from the at least one sensor;
        determine a distance between a feature vector composed of the extracted plurality of different types of feature amounts from the segment and each centroid of the plurality of clusters in the vector space, and determine a cluster whose centroid is a shortest distance from the feature vector as the cluster to which the feature vector belongs from among the plurality of clusters;
        estimate, in real time as the at least one sensor outputs the sensor data, a traveling amount of the user from the feature vector composed of the extracted plurality of types of feature amounts for the segment by inputting the feature vector to the corresponding regression function for the determined cluster to calculate a traveling amount for the segment, calculating traveling amounts for respective successive segments in a measurement period, and providing an accumulated value of the calculated traveling amounts as the estimated traveling amount of the user during the measurement period; and
        output the estimated traveling amount to a display device.

2. The traveling amount estimation apparatus as claimed in claim 1, wherein the sensor data includes a time-series of acceleration data, and the processor is configured to divide the acceleration data into segments based on a local minimum or maximum value of the acceleration data and extract the plurality of types of feature amounts for each segment.

3. The traveling amount estimation apparatus as claimed in claim 1, wherein the plurality of clusters are determined in accordance with k-means method.

4. The traveling amount estimation apparatus as claimed in claim 1, wherein the corresponding regression function for each cluster is estimated in accordance with multiple regression analysis.

5. The traveling amount estimation apparatus as claimed in claim 4, wherein the processor is configured to use the regression function for each cluster corresponding to the cluster to which the feature vector composed of the extracted plurality of types of feature amounts belongs to estimate the traveling amount from the extracted plurality of types of feature amounts.

6. The traveling amount estimation apparatus as claimed in claim 1, wherein the processor is configured to estimate the traveling amount during a measurement period based on a time-series of traveling amount data of the traveling amount estimated for each segment.

7. The traveling amount estimation apparatus as claimed in claim 1, wherein the regression functions are generated by a model generation apparatus that extracts a plurality of different types of feature amounts from the training sensor data, clusters feature vectors composed of the extracted plurality of different types of feature amounts in vector space, and derives the regression function for each cluster in accordance with multiple regression analysis.

8. A traveling amount estimation method executed by a traveling amount estimation apparatus which comprises (i) at least one sensor that detects movement of a user, and outputs sensor data indicative of the movement of the user, (ii) at least one processor, and (iii) at least one memory that stores, in advance, a plurality of clusters of feature vectors plotted in vector space, each feature vector being composed of a plurality of different types of feature amounts for a segment calculated from training sensor data included in training data, wherein each of the plurality of clusters is associated with a corresponding regression function derived based on the feature vectors and traveling amounts associated with the training sensor data, the method comprising:
    controlling, by the processor, the at least one sensor to output sensor data, and obtaining, by the processor, the sensor data output from the at least one sensor;
    extracting, by the processor, a plurality of types of feature amounts from a segment of the sensor data obtained from the at least one sensor;
    determining, by the processor, a distance between a feature vector composed of the extracted plurality of different types of feature amounts from the segment and each centroid of the plurality of clusters in the vector space, and determining, by the processor, a cluster whose centroid is a shortest distance from the feature vector as the cluster to which the feature vector belongs from among the plurality of clusters;
    estimating, by the processor, in real time as the at least one sensor outputs the sensor data, a traveling amount of the user from the feature vector composed of the extracted plurality of types of feature amounts for the segment by inputting the feature vector to the corresponding regression function for the determined cluster to calculate a traveling amount for the segment, calculating traveling amounts for respective successive segments in a measurement period, and providing an accumulated value of the calculated traveling amounts as the estimated traveling amount of the user during the measurement period; and outputting the estimated traveling amount to a display device.

9. A non-transitory recording medium having stored thereon a program that is executable by a computer to cause the computer to:

control at least one sensor, which detects movement of a user and outputs sensor data indicative of the movement of the user, to output the sensor data, and obtain the sensor data output from the at least one sensor;

extract a plurality of types of feature amounts from a segment of the sensor data obtained from the at least one sensor;

access a memory which stores, in advance, a plurality of clusters of feature vectors plotted in vector space, each feature vector being composed of a plurality of different types of feature amounts for a segment calculated from training sensor data included in training data, wherein each of the plurality of clusters is associated with a corresponding regression function derived based on the feature vectors and traveling amounts associated with the training sensor data, and determine a distance between a feature vector composed of the extracted plurality of different types of feature amounts from the segment and each centroid of the plurality of clusters in the vector space, and determine a cluster whose centroid is a shortest distance from the feature vector as the cluster to which the feature vector belongs from among the plurality of clusters;

estimate, in real time as the at least one sensor outputs the sensor data, a traveling amount of the user from the feature vector composed of the extracted plurality of types of feature amounts for the segment by inputting the feature vector to the corresponding regression function for the determined cluster to calculate a traveling amount for the segment, calculating traveling amounts for respective successive segments in a measurement period, and providing an accumulated value of the calculated traveling amounts as the estimated traveling amount of the user during the measurement period; and output the estimated traveling amount to a display device.

10. A system comprising a model generation apparatus and a traveling amount estimation apparatus, wherein the model generation apparatus comprises:

at least one processor; and at least one memory that stores a program executed by the processor, wherein the processor is configured to:

extract a plurality of different types of feature amounts from training sensor data included in training data, wherein the training sensor data is indicative of movement of a user and is associated with traveling amounts of the user;

plot feature vectors in vector space, each feature vector being composed of the plurality of different types of feature amounts for a segment of the training sensor data, and cluster the feature vectors plotted in vector space into a plurality of clusters; and derive a regression function for each cluster in accordance with multiple regression analysis based on the feature vectors and the traveling amounts associated with the training sensor data, and output the plurality of clusters and the respective corresponding regression functions to the travel amount estimation apparatus; and wherein the travel amount estimation apparatus comprises:

at least one sensor that detects movement of a user, and outputs sensor data indicative of the movement of the user;

at least one processor; and at least one memory that stores a program executable by the processor, wherein the at least one memory stores the plurality of clusters of feature vectors in association with the respective corresponding regression functions output from the model generation apparatus, each of the feature vectors being composed of the plurality of different types of feature amounts for a segment calculated from the training sensor data;

wherein the processor is configured, under control of the program, to:

control the at least one sensor to output sensor data, and obtain the sensor data output from the at least one sensor, extract a plurality of types of feature amounts from a segment of the sensor data obtained from the at least one sensor;

determine a distance between a feature vector composed of the extracted plurality of different types of feature amounts from the segment and each centroid of the plurality of clusters in the vector space, and determine a cluster whose centroid is a shortest distance from the feature vector as the cluster to which the feature vector belongs from among the plurality of clusters;

estimate, in real time as the at least one sensor outputs the sensor data, a traveling amount of the user from the feature vector composed of the extracted plurality of types of feature amounts for the segment by inputting the feature vector to the corresponding regression function for the determined cluster to calculate a traveling amount for the segment, calculating traveling amounts for respective successive segments in a measurement period, and providing an accumulated value of the calculated traveling amounts as the estimated traveling amount of the user during the measurement period; and output the estimated traveling amount to a display device.

* * * * *